Nov. 30, 1926.

J. P. SUNDERLAND

TRAIN LIGHTING SYSTEM

Filed May 5, 1921     3 Sheets-Sheet 1

1,609,138

Inventor
John P. Sunderland
By his Attorney
Gorham Crosby

Nov. 30, 1926.

J. P. SUNDERLAND

TRAIN LIGHTING SYSTEM

Filed May 5, 1921

Inventor
John P. Sunderland
By his Attorney
Gorham Crosby

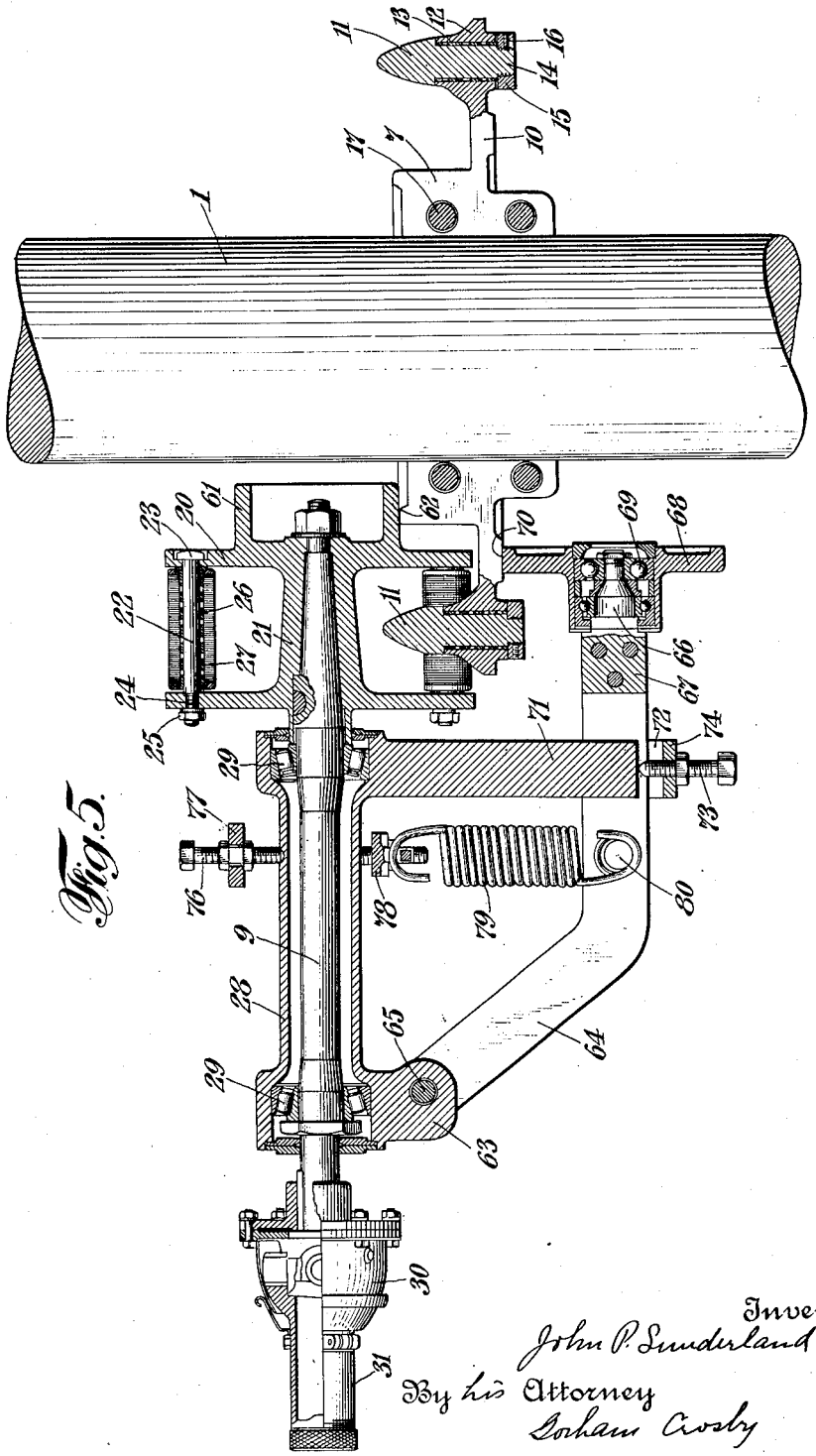

Patented Nov. 30, 1926.

1,609,138

UNITED STATES PATENT OFFICE.

JOHN P. SUNDERLAND, OF NEW YORK, N. Y.

TRAIN-LIGHTING SYSTEM.

Application filed May 5, 1921. Serial No. 466,906.

The invention relates to improvements in train systems and particularly to improvements in the driving connections between the axle of a car and the generator for the lighting system although the improvements in the broader aspects of the invention may be used for driving other instrumentalities than the dynamo or generator and for various purposes. The invention enables the generator to be mounted beneath the car body and to be driven by a positive gear connection having various advantageous features. By this means the driving connection is rendered more certain and dependable at all times and during all weather conditions than is the case when the generator is driven by a belt or chain connection. The drive comprised in the present invention likewise has the advantage of being easily mounted in operative position and of enabling the parts to be taken apart very readily when an axle or gear is to be replaced.

In the production of a driving connection, such as is contemplated herein, various problems involving adjustments and relative motion between parts must be solved. There is a certain amount of play or relative movement between a car truck and the axles thereof, in the lengthwise direction of the axles, and there is also relative movement, in the operation of the train, between the axle and truck, in a vertical direction. There is also of course, relative movement between the truck and the car body, all of which factors have to be considered in the design of a practical form of positive gear connection between the axle and the dynamo.

The object of the invention, generally speaking, is the production of an improved and effective driving connection in devices of the character referred to. Other objects of the invention comprise various details of construction and combinations of parts, all as will be more fully set forth in the following specification and particularly pointed out in the appended claims.

In order that a clearer understanding of the invention may be had attention is hereby directed to the accompanying drawings forming part of this application and illustrating one embodiment of the invention. In the drawings, Fig. 1 represents a side elevation of a driving connection between a car axle and a generator mounted beneath the car body embodying one form of the invention;

Fig. 5 is an enlarged section taken on line 5—5 of Fig. 2.

Figure 1:
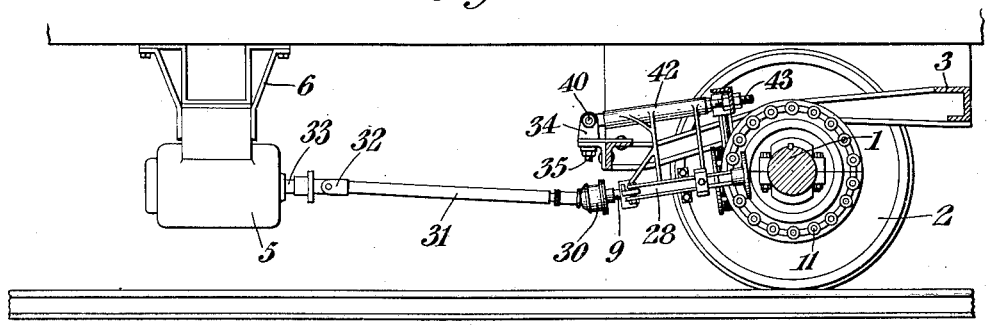
Figure 2:
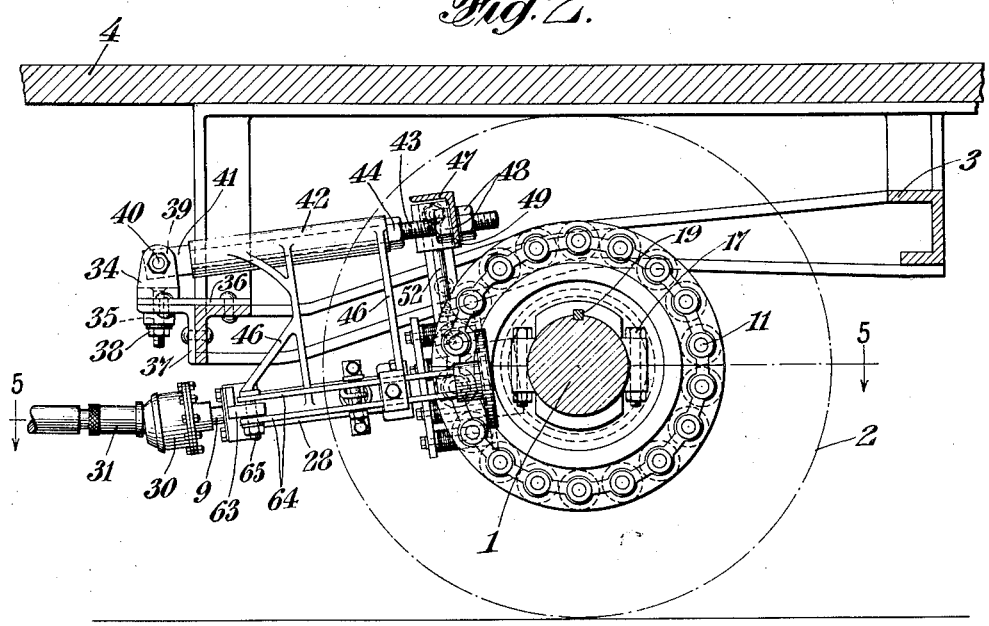
Fig. 2 is an enlarged side elevation of the driving connection between the car axle and the shaft driven thereby, and connected parts, the car axle and portions of the truck frame being shown in cross section in Figs. 1 and 2.

Referring to the drawings, the axle 1 may be one of the axles of a railway car, one of the wheels of which is indicated at 2. A portion of the frame work of a car truck is indicated at 3, the body of the car being indicated at 4. The generator 5 is supported by a suitable support, such as the bracket 6 depending from the underside of the car body.

The gear 7 secured to axle 1 drives a gear on the end of the shaft 9 which forms part of the driving connections between the axle and the generator. In the preferred form of the device gear 7 is provided with a radially extending web portion 10, the teeth 11 being positioned at the outer edge of this web. In the embodiment of the invention shown in the drawings the teeth 11 are parallel to axle 1 and lie in a circle around the same.

Preferably teeth 11 are mounted to rotate about their own axes. Preferably the web 10 of the gear is provided with an enlargement 12 adjacent its outer edge in which sockets are provided for receiving the teeth. These sockets are preferably provided with bushings or bearing members 13 which may be tubular in form and are preferably provided with perforations in which lubricating material may be positioned. Each tooth 11 is rotatively mounted in one of the sockets so formed, each tooth preferably being provided with a screw threaded portion 14 of reduced diameter at its lower end, the tooth being secured in position by a nut 15, which may be screwed up on the screw threaded portion 14 and held in position by a set screw 16. The gear may be secured upon the axle in any suitable way as by forming the gear in two sections which are bolted together about the axle by bolts 17 which extend through the hub portions 18 of the gear, the gear being keyed to the axle by a spline 19.

The gear on the shaft 9 is preferably of the type known as a lantern gear, being provided with end disks 20, 20, and a hub portion 21 which may be keyed on shaft 9. Pins 22 extend through disks 20 adjacent to the outer edges of the disks, pins 22 preferably being secured in position by providing each of the same at one end with a head 23 adapted to fit in a counter sunk opening in one of the disks 20, each pin 22 being provided at its opposite end with a screw threaded portion 24 engaged by a nut 25.

Preferably each pin 22 has a bushing 26 surrounding the same, preferably in the form of a perforated sleeve with lubricating material filling the perforations. A roller 27 of suitable material, such as rawhide, is rotatively mounted on each bushing 26. The parts are so adjusted that teeth 11 of gear 7 will engage rollers 27 to rotate the gear and shaft 9, teeth 11 wiping across rollers 27 in such a manner as to rotate both teeth 11 and rollers 27 about their own axes, so as to produce the minimum of friction.

Shaft member 9 is preferably mounted for rotation within a tubular housing member 28, shaft 9 being provided with suitable bearings within this housing member, such as the roller bearings indicated at 29, 29. Shaft 9 is connected by universal joint 30 with a shaft 31 which may be connected by a universal joint 32 to the shaft 33 of the generator. An extension or telescoping joint may, of course, be included in the connections.

The tubular housing 28 is preferably suspended from the car truck in such a manner as to permit movement of the same in the lengthwise direction of axle 1. In the construction shown in the drawings a bracket 34 is pivotally mounted on a vertical pin 35 which is carried by the truck. Preferably one of the end rails of the car truck has a horizontal plate 36 riveted thereon to overhang the rail, the over-hanging portion of the plate being reinforced by an angle member 37. Pin 35 extends through horizontal flanges of members 36 and 37 and is secured in position by threading a nut 38 on the lower end of the pin.

Bracket 34 may be provided with upwardly extending ears 39 through which extends a horizontal pin 40 on which an arm 41 is mounted to oscillate in a vertical plane. Arm 41 has a cylindrical portion on which a sleeve member 42 is rotatively mounted. The cylindrical portion of arm 41 is screw threaded for a distance, as is indicated at 43, and nut 44 thereon may be screwed up against the end of sleeve member 42 to hold the latter in position between the same and a shoulder on member 41 at the other end of sleeve 42.

Sleeve 42 is provided with downwardly extending arms 46 which are secured to the housing member 28 so that the latter is pivotally hung from member 41, to oscillate about a substantially horizontal axis through an arc in a direction which is substantially parallel to axle 1.

The end of member 41 opposite to pivot 40 is preferably supported at a height which may be adjusted for the purpose of properly lining up shaft 9 at the proper height. The screw threaded end portion 43 of member 41 extends through the downwardly extending flange of an angle bar 47 which may extend in a direction parallel to axle 1. Angle bar 47 may be secured in a desired position lengthwise of member 41 by adjustment of nuts 48, 48, on opposite sides of the flange 49 of the angle member through which the threaded portion 43 of member 41 extends.

Angle member 47 is provided at each end of the same with a laterally extending flange 50 which is bent at right angles to the axial direction of axle 1. A pin 51 extends outwardly through each of these flanges 50. A threaded rod 52 is pivotally mounted on each pin 51, each rod 52 having a flattened upper portion $52^1$ through an opening in which pin 50 extends. A bracket 53 is provided at each end of the bar 47. Each bracket 53 has an upwardly extending flange 54 having a vertical slot 55 therethrough, through which pin 51 extends. Each bracket 53 is provided at the bottom with a horizontal flange 56, through an opening in which the threaded portion of rod 52 extends. Each bracket 53 is also provided with an enlarged portion 57 which fits inside the channeled section of one of the rails $3^1$ of the car truck, to which it may be secured by a suitable means such as rivet 58.

Each pin 51 is provided at its outer end with a nut 59 and each member 52 is provided with nuts 60, 60, above and below flange 56. Each nut 59 being loosened, member 47 may be adjusted up and down by manipulating nuts 60, whereupon nuts 59 may be screwed up to hold the parts in adjusted position.

The lantern gear on shaft 9 is provided with an annular extension 61 which is adapted to rest upon the surface 62 at one side of the hub portion of gear 7. The annular extension 61 will rotate with a surface speed which is the same as that of the surface of the portion of gear 7 upon which it rests, so that friction and slipping at the point of rolling contact will be eliminated.

Housing 28 is provided with an ear 63 and a pair of arms 64, 64, are mounted on opposite sides of the same and pivotally secured thereto by pin 65. Arms 64, in the form of construction illustrated, extend outwardly at an angle and then in a direction parallel to that of shaft 9, toward axle 1. A short shaft member 66 is provided with an extension 67 having plane surfaces, which extension is secured between the end portions of arms 64. A roller, or disk, 68 is rotatively mounted on stud shaft 66, ball bearings 69, or the like, preferably being provided for roller 68. The latter is adapted to bear against surface 70 on the web portion 10 of gear 7, on the side of the gear opposite to that upon which extension 61 has rolling contact.

Figure 3:
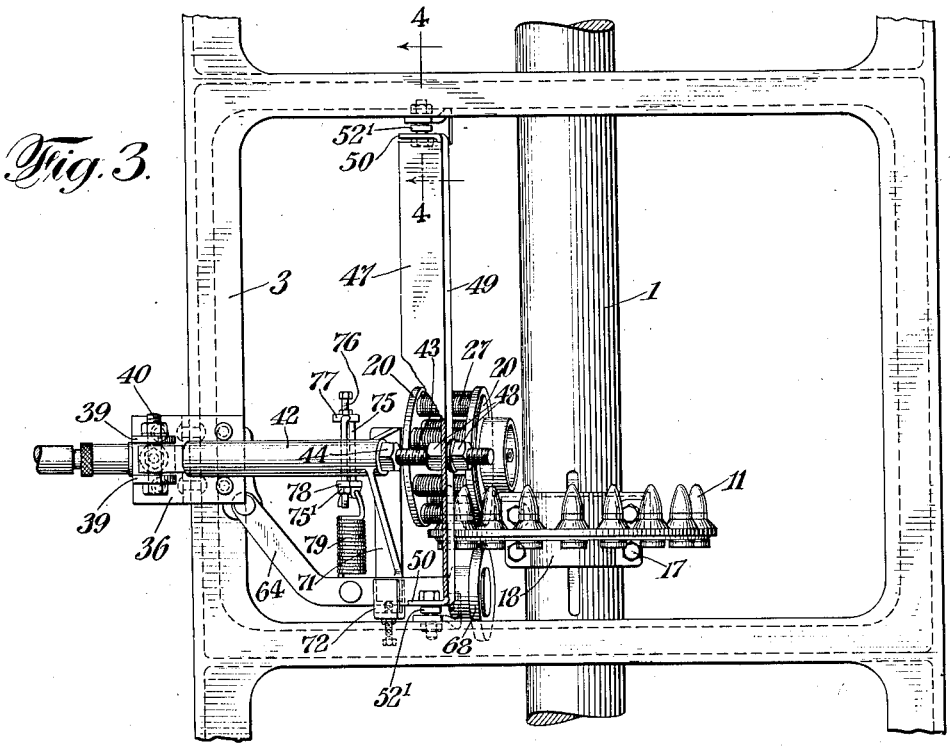
Fig. 3 is a top plan view of the construction shown in Fig. 2.
Figure 4:
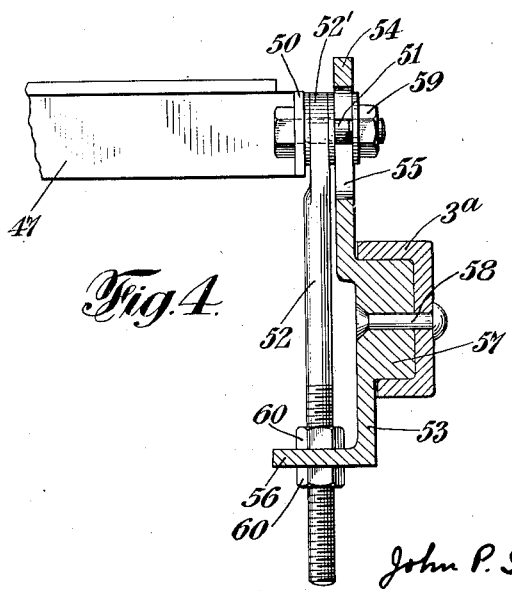
Fig. 4 is an enlarged vertical section taken on line 4—4 of Fig. 3.

Housing 28 is provided with an outwardly extending arm 71. A U shaped clip 72 is secured to the arms 64, as is indicated in Fig. 3, and the outer end of arm 71 extends into the opening between the sides of member 72 and between the arms 64. An adjusting screw 73 extends through the outer portion 74 of this strap 72, and bears against the outer end of arm 71. Screw 73 may be adjusted into position to prevent roller 68 from bearing too hard against surface 70 of gear 7.

A yoke 75 is mounted to extend around housing 28. The ends of the parallel arms of the yoke member 75 carry the head 78 to which is secured one end of a spiral spring 79, the opposite end of which is secured to a pin 80 extending between the two arms 64. The effect of this spring will be to hold roller 68 as closely in engagement with gear 7 as will be permitted by the adjustable stop screw 73. Accordingly, whenever gear 7 and axle 1 move in the lengthwise direction of the axle, relatively to the car truck 3, the lantern gear on shaft 9 will move with the same, rollers 61 and 68 maintaining contact with opposite sides of gear 7. In case a pebble or the like, however, should get between the surface of roller 68 and surface 70 of gear 7, spring 79 will permit arms 64 to move outwardly to clear the obstruction.

The head 78 referred to has an opening therein through which the end of spring 79 passes, and also two openings through which the arms of yoke 75 extend, these arms being screw threaded at their ends. Nuts 75¹ on these screw threaded portions may be screwed up or down to effect a preliminary adjustment of the tension of the spring 79, after which the tension of the spring may be further adjusted by adjusting set screw 76 operating in the member 77 of the opposite end of the yoke 75 and provided with lock nuts for holding the screw 76 in adjusted position.

With the construction described teeth 11 of gear 7 will always engage rollers 27 of the lantern gear at the proper points on the surface of the same, it being noted that the adjustment described above of the angular position of member 42 enables shaft 9 to line up to position the lantern gear in its correct relation to gear 7. It will also be noted that the form of gear connection described also permits relative movement between the car truck and the axle in a vertical plane, to the extent which is likely to occur in practise, without destroying the driving connection between axle 1 and shaft 9.

It should be understood that the invention is not limited to the details of construction described, but is as broad as is indicated by the accompanying claims.

What I claim is:

1. The combination with a car axle of a rotating driving member driven by the axle, a rotating member engaging the driving member and driven thereby, a shaft driven by said rotating driven member, a generator driven by said shaft, a third rotating member oppositely disposed with respect to the second rotating member and means tending to resiliently force the second and third rotating members together whereby the first rotating member is resiliently held in driving engagement with the second rotating member to drive the generator.

2. The combination with a car axle of a rotating driving member driven by the axle, a rotating member engaging the driving member and driven thereby, a shaft driven by said rotating driven member, a generator driven by said shaft, a third rotating member oppositely disposed with respect to the second rotating member and means tending to resiliently force the second and third rotating members together whereby the first rotating member is resiliently held in driving engagement with the second rotating member to drive the generator, said second rotating member having means rotatable against a part rotating with the first rotatable member to limit the movement of the two toward one another.

3. The combination with a car axle of a rotating driving member driven by the axle, a rotating member engaging the driving member and driven thereby, a shaft driven by said rotating driven member, a generator driven by said shaft, a circular part driven by said second rotating member and rotating against a part rotating with the first rotating member at substantially the same surface speed and adapted to limit the movement of the first and second rotating members toward one another, and means tending to resiliently force said first and second rotating members toward one another and into driving engagement with one another.

4. The combination with a car axle of a rotating driving member secured to the axle, a shaft substantially at right angles to the axle, a rotating member secured to said shaft, said second rotating member being engaged by the first and driven thereby, a generator driven by said shaft, a third rotating member oppositely disposed with respect to the first and rotating against a part which rotates with the first, and means tending to resiliently force the second and third rotating members together whereby the first rotating member is resiliently held in driving engagement with the second rotating member to drive the generator.

5. In a car lighting system, the combination with a truck frame and axle and a generator, of a shaft member leading to said generator and extending at an angle to said axle, a gear on said shaft member having teeth parallel to said member, a gear on said axle having teeth extending at an angle to the teeth of said first gear, to drive the same, a housing for said shaft member, and means for pivotally supporting said housing from said truck frame to permit movement thereof in a direction generally parallel to that of said axle.

6. In a car lighting system, the combination with a truck frame and axle and a generator, of a shaft member leading to said generator and extending at an angle to said axle, a gear on said shaft member having teeth parallel to said member, a gear on said axle having teeth extending at an angle to the teeth of said first gear, to drive the same, a housing for said shaft member, means for pivotally supporting said housing from said truck frame to permit movement thereof in the direction of the length of said axle, and means movable with said shaft member adapted to bear on opposite sides of said second gear.

7. In a car lighting system, the combination with a truck frame and axle and a generator, of a shaft member leading to said generator and extending at an angle to said axle, a gear on said shaft member having teeth parallel to said member, and having a cylindrical extension, a gear on said axle having teeth extending at an angle to the teeth of said first gear, to drive the same, and having a hub portion on which said cylindrical extension bears, and having a plane surface on its opposite side, means for pivotally supporting said shaft member from said truck frame, a roller adapted to bear against said plane surface, and an arm carrying said roller and movable with said shaft member in the pivotal movement of the latter.

8. In a car lighting system, the combination with a truck frame and axle and a generator, of a shaft member leading to said generator and extending at an angle to said axle, a gear on said shaft member having teeth parallel to said member, and having a cylindrical extension, a gear on said axle having teeth extending at an angle to the teeth of said first gear, to drive the same, and having a hub portion on which said cylindrical extension bears, and having a plane surface on its opposite side, a housing for said shaft member, means for pivotally supporting said housing from said truck frame, a roller adapted to bear against said plane surface, an arm carrying said roller, pivotally connected to said housing, and a spring connection between said housing and arm.

9. In a car lighting system, the combination with a truck frame and axle and a generator, of a shaft member leading to said generator and extending at an angle to said axle, a lantern gear on said shaft member, a gear on said axle having projecting teeth, adapted to drive said lantern gear, a housing for said shaft member, a rod pivotally supported at one end from said truck frame, means for supporting the opposite end of said rod from said truck frame at an adjustable height, and a member rotatably mounted on said rod, and provided with arms secured to said housing, to support the latter.

10. The combination of a car, a truck and car axle supporting the same, a rotating element on the axle and rotating therewith, a rotating element engaging and driven by the first rotating element, said second rotating element being movable lengthwise of the axle, with respect to the first rotating element, means pivotally supporting said second rotating element from said truck, means holding said rotating elements in driving engagement with one another, a dynamo, and means driving said dynamo from said second rotating element.

11. The combination of a car, a truck and car axle therefor, a rotating element on the axle and rotating therewith, a second rotating element engaging and driven by the first rotating element to rotate about an axis substantially at right angles to the axis of the axle, said second rotating element being movable lengthwise of the axle with respect to the first rotating element, means pivotally supporting the second rotating element from the truck about a substantially horizontal axis, yielding means tending to hold said rotating elements in driving connection with one another, a dynamo and means driving said dynamo from said second rotating element.

12. The combination of a car, a truck and car axle therefor, a rotating element on the axle and rotating therewith, a second rotating element engaging and driven by the first rotating element to rotate about an axis substantially at right angles to the axis of the axle, said second rotating element being movable lengthwise of the axle with respect to the first rotating element, means pivotally supporting the second rotating element from the truck, spring operated means tending to resiliently hold said rotating elements in driving connection with one another, a dynamo supported on the car body and means driving said dynamo from said second rotating element.

13. The combination of a car, a truck and car axle therefor, a rotating element on the axle and rotating therewith, a second rotating element engaging and driven by the first rotating element to rotate about an axis substantially at right angles to the axis of the axle, a frame in which said second rotating element is journalled, said frame with the second rotating element being movable lengthwise of the axle with respect to the first rotating element, yieldable means tending to hold said rotating elements in driving engagement with one another, a dynamo, and means driving said dynamo from said second rotating element.

14. The combination of a car axle, a rotating element thereon and rotating therewith, a rotating element driven thereby about an axis substantially at right angles to the axis of the axle, a dynamo, means whereby the dynamo is driven by said second rotating element and resilient means tending to hold said rotating elements in driving connection, said last mentioned means including a rotating element on the opposite side of the first rotating element from the second rotating element and a spring tending to cause said second and third rotating elements to approach one another to cause the second element to bear against the first element.

15. The combination of a car axle, a rotating element thereon and rotating therewith, a rotating element driven thereby about an axle substantially at right angles to the axis of the axle, a dynamo, means whereby the dynamo is driven by said second rotating element and resilient means tending to hold said rotating elements in driving connection, said last mentioned means including a rotating element rotating on an axis substantially at right angles to the axis of the axle, and on the opposite side of the first rotating element from the second rotating element and a spring tending to cause said second and third rotating elements to approach one another to cause the second element to bear against the first element.

16. The combination of a car, a truck and car axle therefor, a rotating element on the axle and rotating therewith, a second rotating element engaging and driven by the first rotating element to rotate about an axis substantially at right angles to the axis of the axle, a frame in which the second rotating element is journalled, said frame being pivotally supported from the truck about an axis substantially at right angles to the axis of the axle whereby the second rotating element is movable with frame lengthwise of the axle with respect to the first rotating element, an arm pivoted to said frame and carrying a third rotating element rotating about an axis substantially at right angles to the axis of the axle on the opposite side of the first rotating element, a spring acting on said arm to force said second and third rotating elements toward one another, a dynamo supported on the car body and means driving the dynamo from the second rotating element.

17. The combination with a car axle and its truck of a gear having roller members, said gear being driven by the axle, a generator, a shaft for driving the generator, a gear secured to said shaft having roller members in engagement with the roller members of the first gear to be driven thereby, means whereby the second gear and shaft are movable laterally relatively to the truck, a circular part carried by said second gear and rotating against a part rotating with the first gear at substantially the same surface speed and adapted to limit the movement of the first and second gears toward one another, and means tending to resiliently force said first and second gears toward one another and into driving engagement with one another.

18. The combination with a car axle and its truck, of a gear on the axle and having roller members, a second gear having roller members in engagement with the first whereby the first gear drives the second gear by reason of the engagement of the respective roller members of the gears, a shaft driven by said second gear, a dynamo driven by said shaft, means for swingingly supporting said second gear from the truck, said first and second gears being relatively movable with respect to one another, resilient means tending to force said gears toward one another and into driving engagement with one another, a circular part carried by the second gear and adapted to rotate on a rotating part rotating with the first gear and with substantially the same surface speed and acting to limit the movement of said gears toward one another.

19. The combination of a car axle, a car truck supported thereby, a gear secured to the axle and rotating therewith, a lantern gear driven by the first gear, shafting driven by the lantern gear, and a dynamo driven by the said shafting, said lantern gear having rollers meshing with the teeth of the first mentioned gear and said axle gear having roller teeth which roll on the rollers of the lantern gear, and a frame pivotally supported by the truck and in which the lantern gear is journalled whereby the lantern gear is movable with the frame longitudinally of the axle and with respect to the axle gear.

20. The combination of a car axle and truck supported thereby, a rotating element rigidly carried by and rotating with the axle, a rotating element rotating on an axis at an angle to the axis of the first rotating element and engaging the same to be driven thereby, a frame pivotally supported from the truck, in which frame the second rotating element is journalled, said frame being adapted to swing laterally in a direction lengthwise of the axle and with respect to the first rotating element, a dynamo and means driving the dynamo from the second rotating element.

21. The combination of a car and its axles, a gear carried and driven by one of the axles, a gear relatively movable with respect to the first gear but meshing therewith to be driven thereby, a dynamo driven by the second gear, means tending to resiliently force said gears toward one another and into driving engagement with one another, and means for positively limiting the movement of said gears toward one another independently of the teeth of the gears, said gears rotating in planes substantially at right angles to one another and the second gear being swingingly supported from the car truck.

22. The combination of a car, a truck and car axle therefor, a rotating element on the axle and rotating therewith, a second rotating element engaging and driven by the first rotating element to rotate about an axis substantially at right angles to the axis of the axle, said second rotating element being movable lengthwise of the axle with respect to the first rotating element, means pivotally supporting the second rotating element from the truck about a substantially horizontal axis, and yielding means tending to hold said rotating elements in driving connection with one another.

23. The combination of a car axle, a rotating element thereon and rotating therewith, a rotating element driven thereby about an axis substantially at right angles to the axis of the axle, and resilient means tending to hold said rotating elements in driving connection, said last mentioned means including a rotating element on the opposite side of the first rotating element from the second rotating element and a spring tending to cause said second and third rotating elements to approach one another to cause the second element to bear against the first element.

24. The combination of a car and its axles, a gear carried and driven by one of the axles, a gear relatively movable with respect to the first gear and meshing therewith to be driven thereby, a shaft on which the second gear is mounted, a dynamo driven by said shaft, a frame in which said shaft is rotatable, said frame being supported by but movable substantially horizontally with respect to the car truck, a member connected to said frame and having a part bearing against a part on the axle, and a spring operatively associated with said member and frame and tending to resiliently force said gears into driving engagement with one another.

25. The combination with a car, its truck and axles, of a rotating driving member carried by and driven by one of the axles, a rotating member supported from the truck and engaging the driving member to be driven thereby, a generator supported by the car body, flexible shafting for driving the generator from the second rotating member, a circular part driven by said second rotating member and rotating against a part rotating with the first rotating member at substantially the same surface speed and adapted to limit the movement of the first and second rotating members toward one another, and means tending to resiliently force said first and second rotating members toward one another and into driving engagement with one another.

26. The combination of a car axle, a car truck supported thereby, a gear secured to the axle and rotating therewith, a lantern gear driven by the first gear, shafting driven by the lantern gear, said lantern gear having rollers meshing with the teeth of the first mentioned gear and said axle gear having roller teeth which roll on the rollers of the lantern gear, and a frame pivotally supported by the truck and in which the lantern gear is journalled whereby the lantern gear is movable with the frame longitudinally of the axle and with respect to the axle gear.

27. The combination of a car axle and truck supported thereby, a rotating element rigidly carried by and rotating with the axle, a rotating element rotating on an axis at an angle to the axis of the first rotating element and engaging the same to be driven thereby, and a frame pivotally supported from the truck, in which frame the second rotating element is journalled, said frame being adapted to swing laterally in a direction lengthwise of the axle and with respect to the first rotating element.

28. The combination with a car, its truck and axles, of a rotating driving member carried by and driven by one of the axles, a rotating member supported from the truck and engaging the driving member to be driven thereby, a generator supported by the car body, flexible shafting for driving the generator from the second rotating member, said rotating members being provided with roller teeth, a frame movably supporting the second rotating member from the truck, a member connected to said frame and having a part bearing against a part on the axle, and a spring operatively associated with said member and frame and tending to resiliently force the roller teeth of said members into driving engagement with one another.

29. The combination with a car, its truck and axles, of a rotating driving member carried by and driven by one of the axles, a rotating member supported from the truck and engaging the driving member to be driven thereby, a generator supported by the car body, flexible shafting for driving the generator from the second rotating member, said rotating members being provided with roller teeth, a frame movably supporting the second rotating member from the truck, a member connected to said frame and having a part bearing against a part on the axle, and a spring operatively associated with said member and frame and tending to resiliently force said gears into driving engagement with one another, a circular part driven by said second rotating member and rotating against a part rotating with the first rotating member at substantially the same surface speed and adapted to limit the movement of the first and second rotating members toward one another.

30. In the transmission of power the combination with a driving shaft, an axle, a member rotatively mounted thereon, and a part to be driven, the angular position between the driving shaft and the said member being variable, of power transmission mechanism effecting operative connection between the member upon the axle and the said part to be driven, means operatively connecting one end of the mechanism to the part to be driven, means supporting the end of the mechanism contiguous to the member upon the axle, a part distinct from the axle, such last mentioned means being pivoted to the last mentioned part, a member carried by the said end of the mechanism, such member being a companion to the member upon the axle and adapted to be rotated thereby, and spring mechanism yieldingly maintaining the said second member in engagement with the member upon the axle.

31. The combination with a car body and a car axle, of a generator mounted to be stationary with respect to the car body, a gear wheel mounted on the axle, a shaft hanger supported for swinging movement in respect to said gear wheel, a drive shaft journaled in said hanger, a pinion mounted on said shaft and meshing with said gear wheel, cooperating annular surfaces rotating with said axle and said shaft respectively for maintaining the gear wheel and the pinion constantly in proper mesh regardless of any movements of the car axle relative to the driven shaft, and means for transmitting motion from said shaft to said generator.

32. In the transmission of power the combination with a driven axle and a member mounted thereon and adapted to transmit rotation, a part to be driven, the angular position whereof relatively to the axle is variable, of transmission mechanism consisting of a movably mounted member in operative relation with the member upon the axle, means including universal rotative connections between the movable member and part to be driven, and means yieldingly maintaining the movable member in the rotative relation with the member upon the axle.

33. In apparatus of the general nature of that herein described, in combination, a car axle, a gear mounted on said car axle, a second gear adapted to cooperate with and be driven from said car axle gear, said car axle gear having teeth of such effective length with respect to the pitch diameter of said second gear as to be substantially longer than the teeth of standard gearing, said long teeth of the car axle gear forming pockets opening toward said second gear, whereby a relative movement of the gears may be had which is greater than can be had with standard gearing and while still retaining the gears in operative mesh, means yieldingly maintaining said second gear in driving relation to said car axle gear to permit said relative movement to take place therebetween, an electric generator, and a flexible driving connection between said second gear and said generator.

34. In apparatus of the general nature of that herein described, in combination, a car axle, a truck frame associated therewith, a gear mounted upon said car axle, an auxiliary shaft, a gear mounted upon said shaft and adapted to be driven from said car axle gear, means for pivotally mounting said auxiliary shaft on said truck frame to permit said auxiliary shaft and its associated gear to move toward or away from the teeth of said car axle gear, means for yieldingly forcing said auxiliary shaft and the associated gear toward said car axle gear thereby to maintain said two gears in driving connection, an electric generator, and means forming a flexible driving connection between said auxiliary shaft and said generator.

35. In apparatus of the general nature of that herein described, in combination, a car axle, a gear mounted upon said car axle, a second gear, means mounting said second gear in driving relation to said car axle gear and adapted to permit said second gear to move toward or away from said first gear, a relatively stationary electric generator, means forming a driving connection between said second gear and said generator, means for yieldingly holding said second gear in driving relation with said car axle gear, and means for limiting the movement of said second gear toward said car axle gear.

Signed at New York in the county of New York and State of New York this 28th day of April, A. D. 1921.

JOHN P. SUNDERLAND.